United States Patent [19]

Ohkoshi et al.

[11] Patent Number: 5,009,078
[45] Date of Patent: Apr. 23, 1991

[54] MULTI-SYSTEM AIR CONDITIONING MACHINE

[75] Inventors: Seizi Ohkoshi; Eiji Kuwahara, both of Fuji, Japan

[73] Assignee: Kabushiki Kaisha Toshiba, Kawasaki, Japan

[21] Appl. No.: 483,654

[22] Filed: Feb. 23, 1990

[30] Foreign Application Priority Data

Feb. 27, 1989 [JP] Japan .................. 1-45738

[51] Int. Cl.[5] ............................ F25B 13/00
[52] U.S. Cl. ........................ 62/160; 62/181; 62/324.6
[58] Field of Search ............. 62/160, 324.6, 324.1, 62/181

[56] References Cited

U.S. PATENT DOCUMENTS 4,862,705  9/1989  Nakamura et al. ............. 62/324.6
4,878,357  11/1989  Sekigami et al. .............. 62/160

FOREIGN PATENT DOCUMENTS 61-45145  10/1986  Japan .

Primary Examiner—William E. Wayner
Attorney, Agent, or Firm—Cushman, Darby & Cushman

[57] ABSTRACT

A total cooling capability requested from one or a plurality of indoor units is compared with a total heating capability requested from one or the plurality of indoor units to set a cooling or heating operation mode.

11 Claims, 13 Drawing Sheets

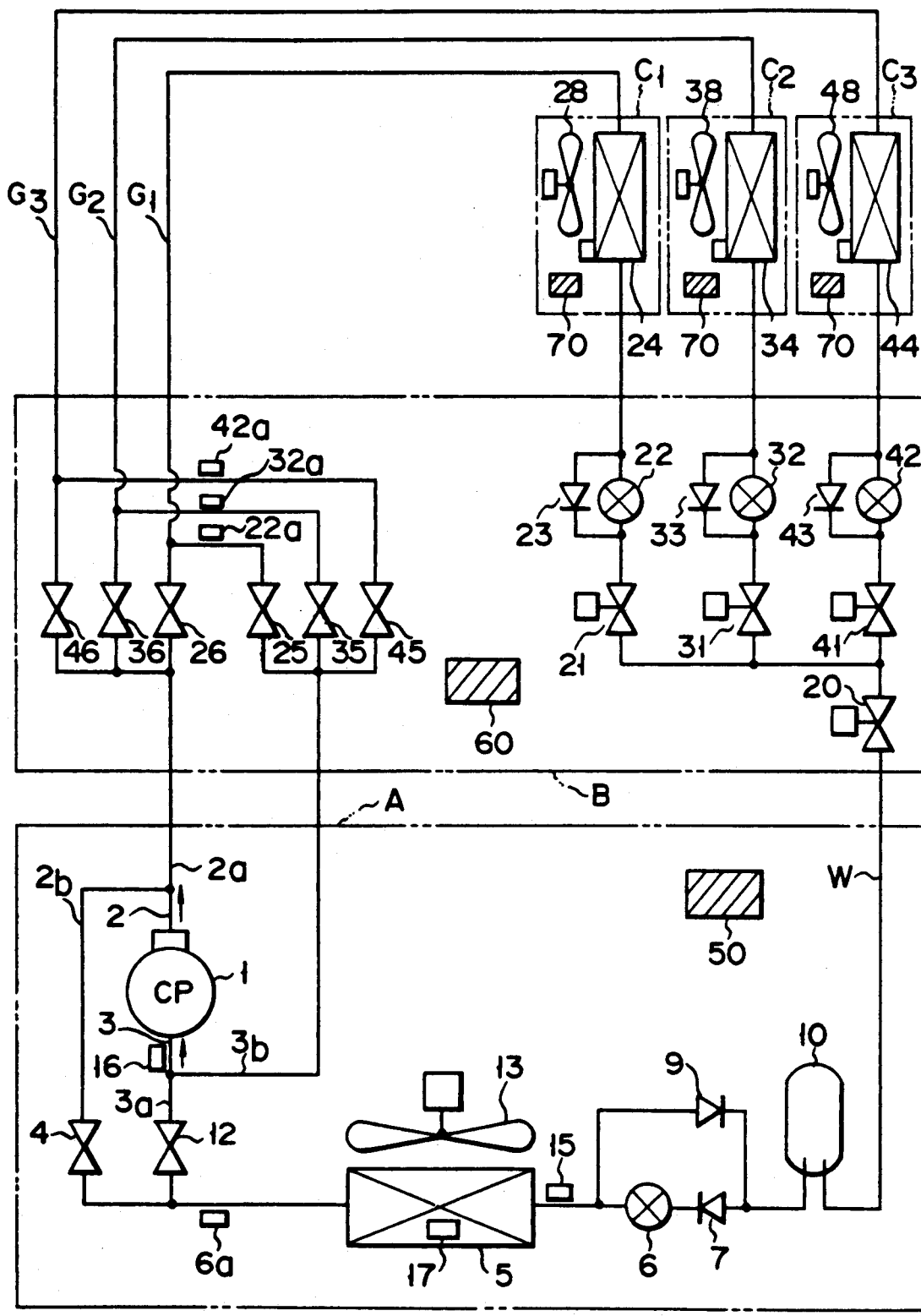
F I G. 1

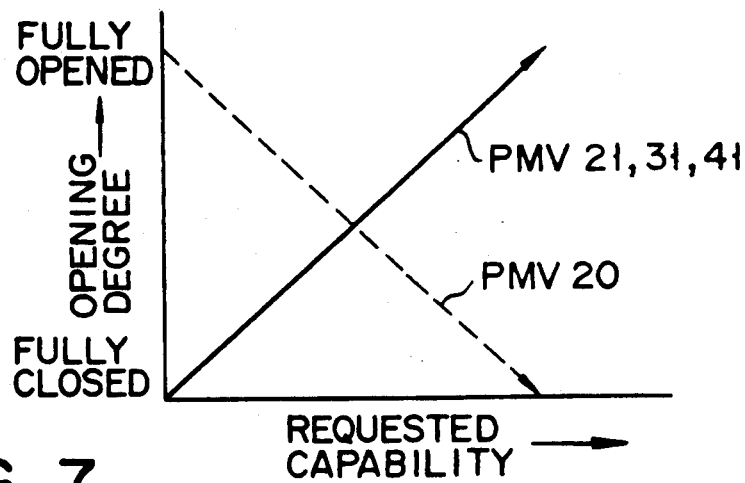
F I G. 7
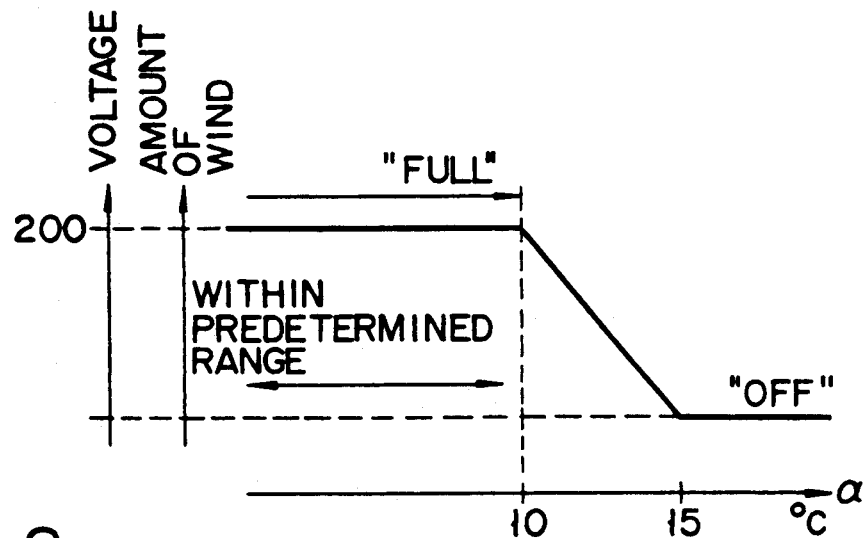
F I G. 8
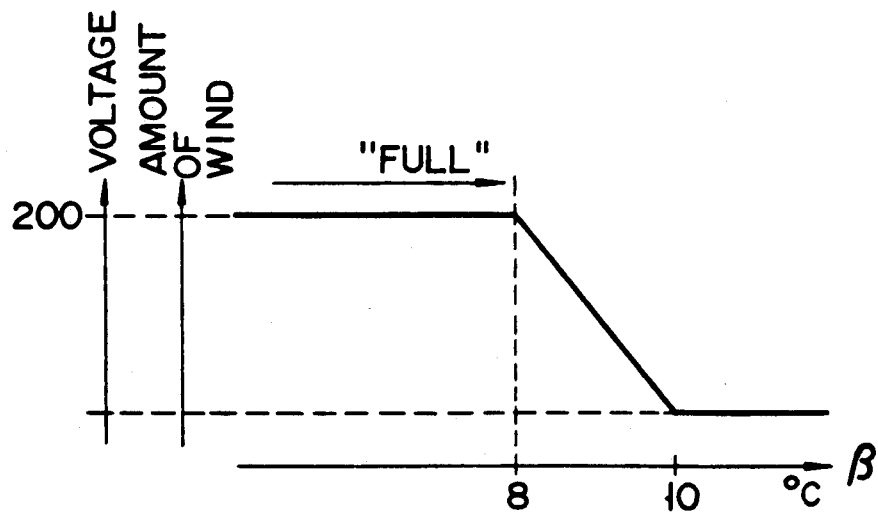
F I G. 10

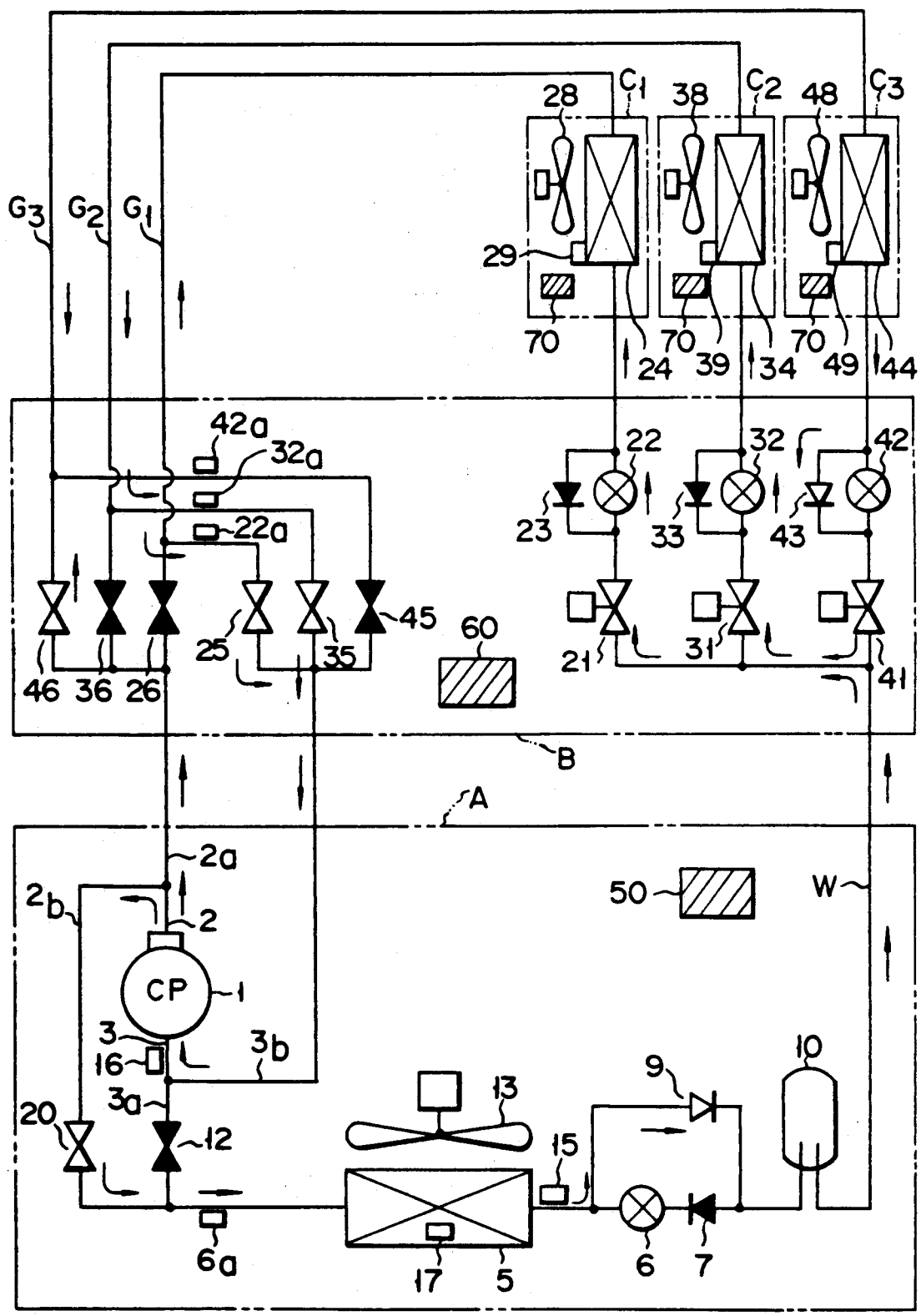
F I G. 14

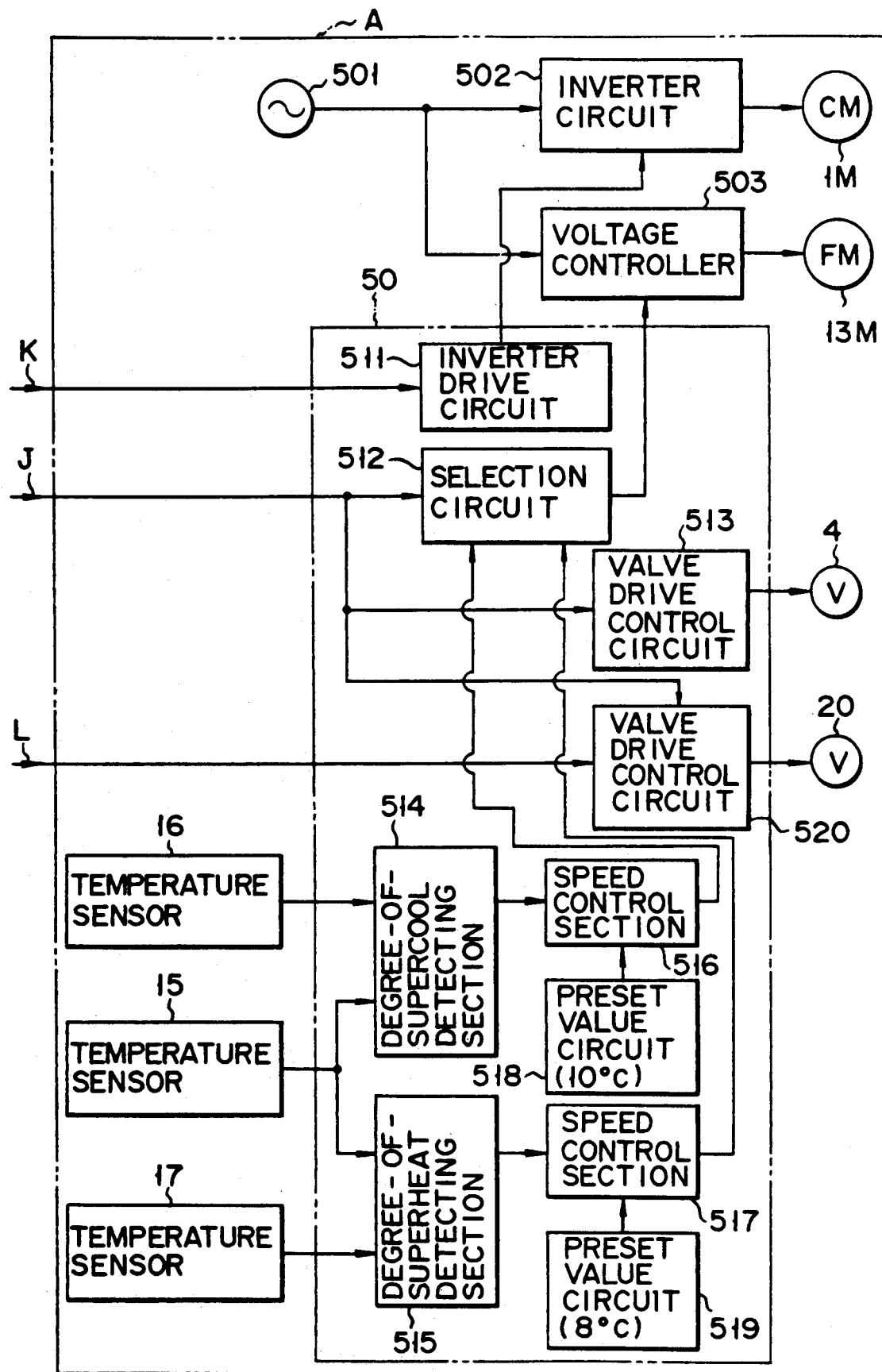
F I G. 15

MULTI-SYSTEM AIR CONDITIONING MACHINE

BACKGROUND OF THE INVENTION

1. Field of the Invention

The present invention relates to a multi-system air conditioning machine of a multi type including a plurality of indoor units.

2. Description of the Related Art

A multi-system air conditioning machine of a multi type including one outdoor unit and a plurality of indoor units to constitute a heat-pump refrigerating apparatus between these units is conventionally known.

This multi-system air conditioning machine is convenient because a plurality of rooms in a building can be simultaneously cooled or heated.

In a building including a computer room or a perimeter or interior zone, however, when a request for a cooling operation is raised from one place, a request for a heating operation may often be raised from another place at the same time.

In this case, a cooling or heating operation must be preferentially performed.

For this reason, even if a good environment can be obtained in one place, a resident may feel uncomfortable in another place, or an equipment such as a computer may often be adversely affected.

The above disadvantages easily occur not only in a building but also in a normal house having a plurality of rooms during an intermediate season such as spring or fall.

On the other hand, an air conditioning machine which can execute a heating operation of at least one indoor unit while at least one of a plurality of indoor units performs a cooling operation is disclosed in Published Examined Japanese Patent Application No. 61-45145.

This application, however, describes only the basic flow of a refrigerant required to simultaneously execute cooling and heating operations in a plurality of indoor units, and does not describe switching of operation modes and setting of a capability in accordance with each request of the plurality of indoor units at all.

SUMMARY OF THE INVENTION

It is an object of the present invention to provide a multi-system air conditioning machine which can simultaneously execute cooling and heating operations in a plurality of indoor units, can automatically switch operation modes of each indoor unit in accordance with a request of the indoor unit, and can automatically set a capability of each indoor unit in a appropriate state in accordance with a request of each indoor unit.

According to the present invention, there is provided an air conditioning machine comprising:

an outdoor unit including a compressor for drawing, compressing, and delivering a refrigerant, and an outdoor heat exchanger for exchanging heat of the supplied refrigerant and heat of outer air;

a plurality of indoor units each including an indoor heat exchanger for exchanging the heat of the supplied refrigerant and heat of inner air, for requesting a cooling operation mode and a cooling capability or a heating operation mode and a heating capability;

means for supplying the refrigerant delivered from the compressor to the outdoor heat exchanger, supplying the refrigerant to one or the plurality of indoor units which request a cooling operation mode, and returning the refrigerant to the compressor when a total cooling capability requested from one or the plurality of indoor units is larger than a total heating capability requested from the remaining one or plurality of indoor units;

means for supplying a part of the refrigerant delivered from the compressor to one or the plurality of indoor units which request a heating Operation mode to cause the part of refrigerant to join the flow of the refrigerant to one or the plurality of the indoor units which request a cooling operation mode, when a total cooling capability requested from one or the plurality of indoor units is larger than a total heating capability requested from the remaining one or the plurality of indoor units;

setting means for setting an amount of refrigerant supplied to the outdoor heat exchanger to be relative to an amount of refrigerant supplied to one or the plurality of indoor units which request the heating operation mode in accordance with the total heating capability requested from one or the plurality of indoor units when the total cooling capability requested from one or the plurality of indoor units is larger than the total heating capability requested from the remaining one or the plurality of indoor units;

means for supplying the refrigerant delivered from the compressor to one or the plurality of indoor units which request a heating operation mode, supplying the refrigerant to the outdoor heat exchanger, and returning the refrigerant to the compressor, when a total heating capability requested from one or the plurality of indoor units is larger than a total cooling capability requested from the remaining one or plurality of indoor units;

means for supplying a part of the refrigerant supplied from one or the plurality of indoor units which request a heating operation mode to one or the plurality of indoor units which request a cooling operation mode, and returning the refrigerant to the compressor, when a total heating capability requested from one or the plurality of indoor units is larger than a total cooling capability requested from the remaining one or plurality of indoor units; and setting means for setting an amount of refrigerant supplied to the outdoor heat exchanger to be relative to an amount of refrigerant supplied to one or the plurality of indoor units which request the cooling operation mode in accordance with the total cooling capability requested from one or the plurality of indoor units when the total heating capability requested from one or the plurality of indoor units is larger than the total cooling capability requested from the remaining one or the plurality of indoor units.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a diagram showing an entire arrangement of a multi-system air conditioning machine according to the first embodiment of the present invention;

FIG. 7 is a graph showing a change in opening degrees of PMVs of the multi-system air conditioning machine according to the first embodiment;

FIG. 8 is a graph for explaining outdoor fan control in the cooling operation mode of the multi-system air conditioning machine according to the first embodiment;

FIG. 10 is a graph for explaining outdoor fan control in the heating operation mode of the multi-system air conditioning machine according to the first embodiment;

FIG. 14 is a diagram showing an entire arrangement of a multi-system air conditioning machine according to the third embodiment of the present invention; and FIG. 15 is a block diagram showing a multi-control section and its peripheral sections of the multi-system air conditioning machine according to the third embodiment.

DETAILED DESCRIPTION OF THE PREFERRED EMBODIMENTS

Figure 2:
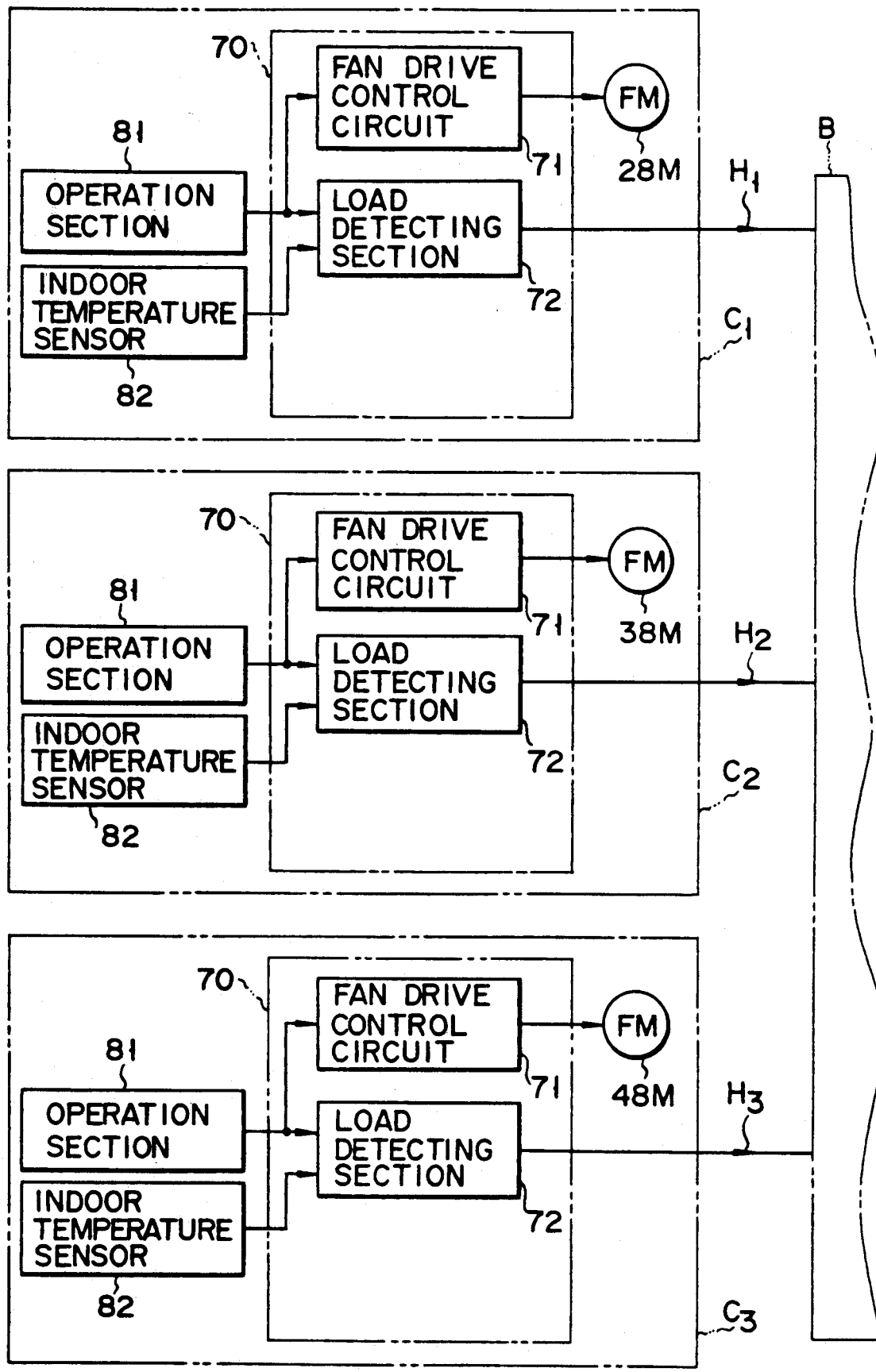
FIG. 2 is a block diagram showing indoor control sections and their peripheral sections of the multi-system air conditioning machine according to the first embodiment.

The first embodiment of the present invention will be described hereinafter with reference to the accompanying drawings.

Referring to FIG. 1, reference symbol A denotes an outdoor unit. A plurality of indoor units $C_1$, $C_2$, and $C_3$ are connected to the outdoor unit A through a switching unit B.

These outdoor unit A, switching unit B, and indoor units $C_1$, $C_2$, and $C_3$ constitute the following refrigerating apparatus.

The outdoor unit A includes a variable-capability compressor 1. The compressor 1 draws a refrigerant through a refrigerant intake port, compresses the refrigerant, and delivers the compressed refrigerant through a refrigerant outlet port.

An outlet pipe 2 is connected to the refrigerant outlet port of the compressor 1.

An intake pipe 3 is connected to the refrigerant intake port of the compressor 1.

The outlet pipe 2 is branched into two outlet pipes $2a$ and $2b$.

The intake pipe 3 is branched into two intake pipes $3a$ and $3b$.

An outdoor heat exchanger 5 is connected to the outlet pipe $2b$ through a two-way valve 4. The outdoor heat exchanger 5 exchanges heat of the supplied refrigerant and heat of outer air.

A liquid tank 10 is connected to the outdoor heat exchanger 5 through a series circuit consisting of a heating expansion valve 6 and a check valve 7, and a check valve 9. A liquid-side pipe W is connected to the liquid tank 10.

The intake pipe $3a$ is connected to a refrigerant pipe between the two-way valve 4 and the outdoor heat exchanger 5 through a two-way valve 12.

Cooling expansion valves 22, 32, and 42 are connected to the liquid-side pipes W through PMVs 20, 21, 31, and 41 in the switching unit B, respectively. Check valves 23, 33, and 43 are connected in parallel to the expansion valves 22, 32, and 42, respectively.

Indoor heat exchangers 24, 34, and 44 of the indoor units $C_1$, $C_2$, and $C_3$ are connected to the expansion valves 22, 32, and 42, respectively. These indoor heat exchangers 24, 34, and 44 exchange heat of the supplied refrigerant and heat of inner air.

Gas-side pipes $G_1$, $G_2$, and $G_3$ are connected to the indoor heat exchangers 24, 34, and 44, respectively.

Each of the gas-side pipes $G_1$, $G_2$, and $G_3$ is branched into two pipes.

One branch pipe of each of the gas-side pipes $G_1$, $G_2$, and $G_3$ is connected to the inlet pipe $3b$ through the corresponding one of two-way valves 25, 35, and 45 in the switching unit B.

The other branch pipe of each of the gas-side pipes $G_1$, $G_2$, and $G_3$ is connected to the outlet pipe $2a$ through the corresponding one of two-way valves 26, 36, and 46 in the switching unit B.

Note that the outdoor unit A also includes an outdoor fan 13 for circulating the outer air in the outdoor heat exchanger 5.

A temperature sensor 15 is attached to a pipe between the outdoor heat exchanger 5 and the valves 6 and 9. A temperature sensed by the temperature sensor 15 is denoted by reference symbol $T_1$.

A temperature sensor 16 is attached to the intake pipe 3. A temperature sensed by the temperature sensor 16 is denoted by reference symbol $T_2$.

A temperature sensor 17 is attached to the outdoor heat exchanger 5. A temperature sensed by the temperature sensor 17 is denoted by reference symbol $T_3$.

A heat-sensitive section $6a$ is attached to the refrigerant pipe between the two-way valves 4 and 12 and the outdoor heat exchanger 5.

The heat-sensitive section $6a$ is a part attached to the heating expansion valve 6.

The expansion valve 6 has a function of detecting a difference between a temperature sensed by the heat-sensitive section 6a and a temperature of a refrigerant supplied to the valve 6, i.e., a degree of superheat of the refrigerant in the outdoor heat exchanger 5. The expansion valve 6 also has a function of controlling an amount of refrigerant supplied to the outdoor heat exchanger 5 to set the detected degree of superheat to be constant.

Heat-sensitive sections 22a, 32a, and 42a are respectively attached to corresponding ones (on the side of two-way valves 25, 35, and 45) of the branch pipes of the gas-side pipes $G_1$, $G_2$, and $G_3$. The heat-sensitive sections 22a, 32a, and 42a are parts respectively attached to the cooling expansion valves 22, 32, and 42.

The expansion valves 22, 32, and 42 respectively include the functions for detecting differences between temperatures sensed by the heat-sensitive sections 22a, 32a, and 42a and temperatures of the refrigerant in the valves 22, 32, and 42, i.e., a degree of superheat of the refrigerant supplied to the indoor heat exchangers 24, 34, and 44. The expansion valves 22, 32, and 42 respectively include the functions for regulating an amount of the refrigerant supplied to the indoor heat exchangers 24, 34, and 44 to set the detected degree of superheat to be constant.

In the indoor units $C_1$, $C_2$, and $C_3$ include an indoor fans 28, 38, and 48 for circulating the inner air in the indoor heat exchangers 24, 34, and 44, respectively.

On the other hand, the indoor unit A includes an outdoor control section 50.

The outdoor control section 50 controls an inverter for driving a compressor, the two-way valve 4, the PMV 8, the two-way valve 12, and the outdoor fan 13.

The switching unit B includes a multi-control section 60.

The multi-control section 60 controls the PMVs 21, 31, and 41 and two-way valves 25, 35, 45, 26, 36, and 46.

The indoor units $C_1$, $C_2$, $C_3$ include indoor control sections 70, respectively.

Each indoor control section 70 transfers a request for a cooling operation mode and a cooling capability, or a request for a heating operation mode and a heating capability to the multi-control section 60, and controls the corresponding one of the indoor fans 28, 38, and 48.

The outdoor control section 50, the multi-control section 60 and the two-way valves constitute the following means (1) to (4):

(1) a means for supplying the refrigerant delivered from the compressor 1 to the outdoor heat exchanger 5, supplying the refrigerant to one or the plurality of indoor units which request a cooling operation mode, and returning the refrigerant to the compressor 1 when a total cooling capability requested from one or the plurality of indoor units is larger than a total heating capability requested from the remaining one or the plurality of indoor units (cooling operation mode);

(2) a means for partially supplying the refrigerant delivered from the compressor 1 to one or the plurality of indoor units which request a heating operation mode to cause the refrigerant to join the flow of the refrigerant to one or the plurality of indoor units which request a cooling operation mode, when a total cooling capability requested from one or the plurality of indoor units is larger than a total heating capability requested from the remaining one or the plurality of indoor units (cooling operation mode);

(3) a means for supplying the refrigerant delivered from the compressor 1 to one or the plurality of indoor units which request a heating operation mode, supplying the refrigerant to the outdoor heat exchanger 5, and returning the refrigerant to the compressor 1, when a total heating capability requested from one or the plurality of indoor units is larger than a total cooling capability requested from the remaining one or the plurality of indoor units (heating operation mode); and (4) a means for partially supplying the refrigerant supplied from one or the plurality of indoor units which request a heating operation mode to one or the plurality of indoor units which request a cooling operation mode, and returning the refrigerant to the compressor 1, when a total heating capability requested from one or the plurality of indoor units is larger than a total cooling capability requested from the remaining one or the plurality of indoor units (heating operation mode).

The multi-control section 60 and the PMVs 20, 21, 31, and 41 constitute the following means (1) and (2):

(1) a setting means for setting an amount of refrigerant supplied to the outdoor heat exchanger to be relative to an amount of refrigerant supplied to one or the plurality of indoor units which request the heating operation mode in accordance with the total heating capability requested from one or the plurality of indoor units when the total cooling capability requested from one or the plurality of indoor units is larger than the total heating capability requested from the remaining one or the plurality of indoor units (cooling operation mode); and (2) a setting means for setting an amount of refrigerant supplied to the outdoor heat exchanger to be relative to an amount of refrigerant supplied to one or the plurality of indoor units which request the cooling operation mode in accordance with the total cooling capability requested from one or the plurality of indoor units when the total heating capability requested from one or the plurality of indoor units is larger than the total cooling capability requested from the remaining one or the plurality of indoor units (heating operation mode).

In addition, the outdoor control section 50 and the temperature sensors 15 and 17 constitute a detecting means for detecting a degree $\alpha$ of supercool of the refrigerant in the outdoor heat exchanger 5.

More specifically, the degree $\alpha$ of supercool is detected as a difference ($T_3 - T_1$) between the temperature $T_3$ of the refrigerant supplied to the outdoor heat exchanger 5 and the temperature $T_1$ of the refrigerant supplied from the outdoor heat exchanger 5.

The outdoor control section 50 and the temperature sensors 15 and 16 constitute a detecting means for detecting a degree $\beta$ of superheat of the refrigerant in the outdoor heat exchanger 5.

More specifically, the degree $\beta$ of superheat is detected as a difference ($T_2 - T_1$) between the temperature $T_2$ of the refrigerant supplied from the outdoor heat exchanger 5 and the temperature $T_1$ of the refrigerant supplied to the outdoor heat exchanger 5.

The outdoor control section 50 serves as a control means for controlling a speed of the outdoor fan 13 so that the degree $\alpha$ of supercool and the degree $\beta$ of superheat which are detected respectively fall within predetermined ranges.

A detailed arrangement of each indoor control section 70 and its peripheral sections is shown in FIG. 2.

Each indoor control section 70 includes a fan drive control circuit 71, a load detecting section 72, and a signal processing circuit 73.

The fan drive control circuit 71 in the indoor unit $C_1$ controls a motor 28M for the indoor fan 28 in accordance with an operation of an operation section 81.

The fan drive control circuit 71 in the indoor unit $C_2$ controls a motor 38M for the indoor fan 38 in accordance with an operation of the operation section 81.

The fan drive control circuit 71 in the indoor unit $C_3$ controls a motor 48M for the indoor fan 48 in accordance with an operation of the operation section 81.

The load detecting section 72 in the indoor unit $C_1$ has the following functions (1) to (3):

(1) a function of requesting an operation mode set by the operation section 81, to the multi-control section 60 by supplying a signal $H_1$ thereto;

(2) a function of detecting a difference between a room temperature set by the operation section 81 and a temperature sensed by a room temperature sensor 82, i.e., a load; and (3) a function of requesting a cooling or heating capability, which corresponds to the detected load, to the multi-control section 60 by supplying the signal $H_1$ thereto.

The load detecting section 72 in the indoor unit $C_2$ has the following functions (1) to (3):

(1) a function of requesting an operation mode set by the operation section 81, to the multi-control section 60 by supplying a signal $H_2$ thereto;

(2) a function of detecting a difference between a room temperature set by the operation section 81 and a temperature sensed by the room temperature sensor 82, i.e., a load; and (3) a function of requesting a cooling or heating capability, which corresponds to the detected load, to the multi-control section 60 by supplying the signal $H_2$ thereto.

The load detecting section 72 in the indoor unit $C_3$ has the following functions (1) to (3):

(1) a function of requesting an operation mode set by the operation section 81, to the multi-control section 60 by supplying a signal $H_3$ thereto;

(2) a function of detecting a difference between a room temperature set by the operation section 81 and a temperature sensed by the room temperature sensor 82, i.e., a load; and (3) a function of requesting a cooling or heating capability, which corresponds to the detected load, to the multi-control section 60 by supplying the signal $H_3$ thereto.

Figure 3:
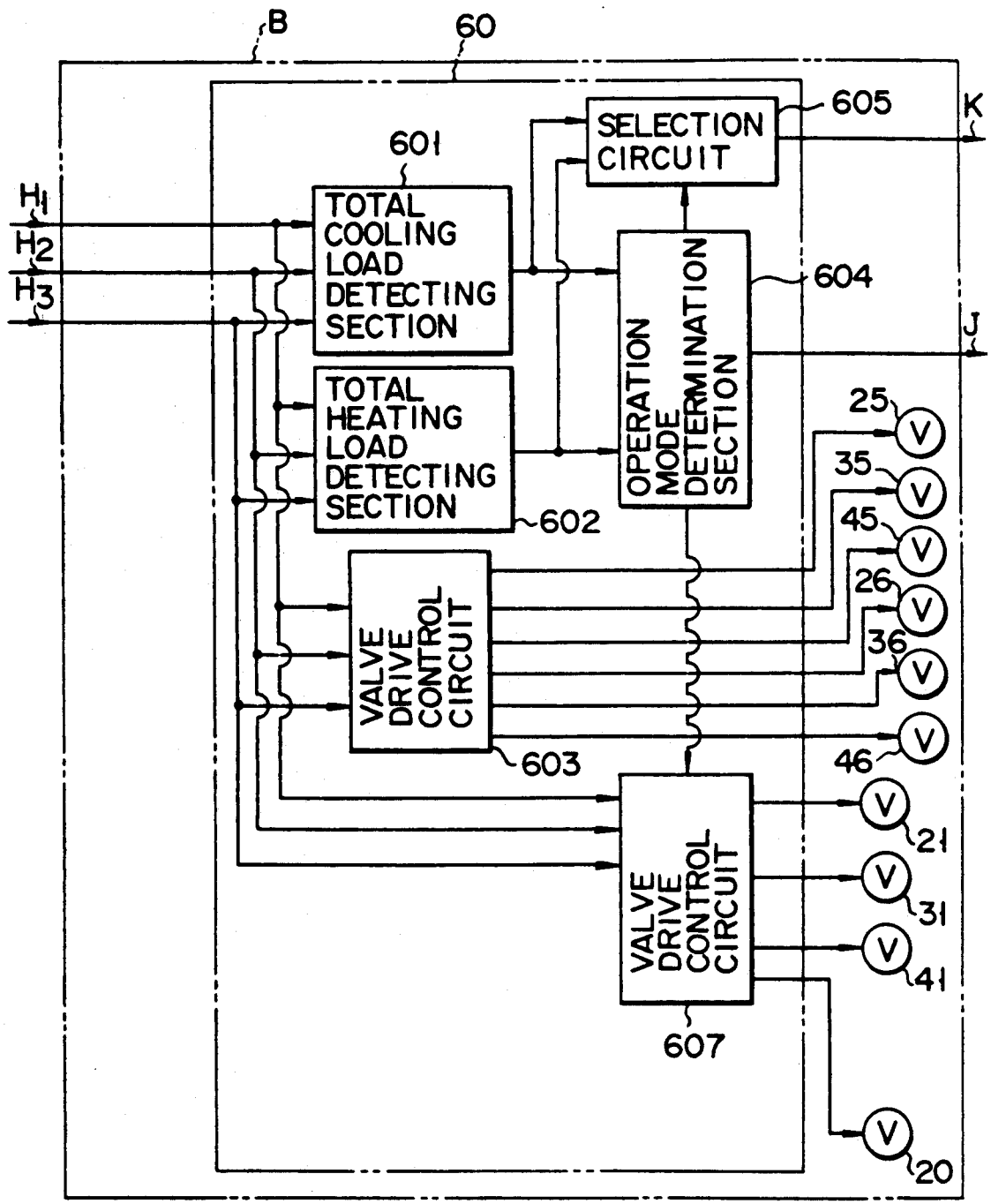
FIG. 3 is a block diagram showing a multi-control section and its peripheral sections of the multi-system air conditioning machine according to the first embodiment.

A detailed arrangement of the multi-control section 60 and its peripheral circuits is shown in FIG. 3.

The multi-control section 60 includes a total cooling load detecting section 601, a total heating load detecting section 602, a valve drive control circuit 603, an operation mode determination section 604, a selection circuit 605, and a valve drive control circuit 607.

The total cooling load detecting section 60 has the following functions (1) and (2):

(1) a function of discriminating a request for a cooling capability on the basis of the signals $H_1$, $H_2$, and $H_3$ from the indoor control sections 70; and (2) a function of detecting the discriminated total cooling capability.

The total heating load detecting section 602 has the following functions (1) and (2):

(1) a function of discriminating a request for a heating capability on the basis of the signals $H_1$, $H_2$, and $H_3$ from the indoor control sections 70; and (2) a function of detecting the discriminated total heating capability.

The valve drive control circuit 603 has the following functions (1) and (2):

(1) a function of discriminating a request for a cooling or heating operation mode on the basis of the signals $H_1$, $H_2$, and $H_3$ from the indoor control sections 70; and (2) a function of controlling an opening/closing state of each of the two-way valves 25, 35, 45, 26, 36, and 46 in accordance with the discrimination result. For example, when the signal $H_1$ represents a request for a cooling operation mode, the two-way valve 25 is opened, and the two-way valve 26 is closed. When the signal $H_1$ represents a request for a heating operation mode, the two-way valve 25 is closed, and the two-way valve 26 is opened.

The operation mode determination section 604 has the following functions (1) to (3):

(1) a function of determining a cooling operation mode when a total cooling capability detected by the total cooling load detecting section 60 is larger than a total heating capability detected by the total heating load detecting section 602;

(2) a function of determining a heating operation mode when the total heating capability detected by the total heating load detecting section 602 is larger than the total cooling capability detected by the total cooling load detecting section 601; and (3) a function of supplying the determination content to the outdoor control section 50 by a signal J.

The selection circuit 605 has the following functions (1) and (2):

(1) a function of giving the total cooling capability detected by the total cooling load detecting section 601 to the outdoor control section 50 by a signal K when a cooling operation mode is determined by the operation mode determination section 604; and (2) a function of giving the total heating capability detected by the total heating load detecting section 602 to the outdoor control section 50 by the signal K when a heating operation mode is determined by the operation mode determination section 604.

The valve drive control circuit 607 controls the PMVs 20, 21, 31, and 41. The circuit 607 has the following functions.

More specifically, the valve drive control circuit 607 executes the following functions (1) to (3) when a cooling operation mode is determined by the operation mode determination section 604:

(1) a function of discriminating a request for a cooling or heating operation mode on the basis of the signals $H_1$, $H_2$, and $H_3$ from the indoor control sections 70;

(2) a function of controlling the opening degree of the PMV 21 corresponding to the indoor unit $C_1$ in accordance with a cooling capability requested by the indoor unit $C_1$ when the signal $H_1$ represents a request for a cooling operation mode, a function of controlling the opening degree of the PMV 31 corresponding to the indoor unit $C_2$ in accordance with a cooling capability requested by the indoor unit $C_2$ when the signal $H_2$ represents a request for the cooling operation mode, and a function of controlling the opening degree of the PMV 41 corresponding to the indoor unit $C_3$ in accordance with a cooling capability requested by the indoor unit $C_3$ when the signal $H_3$ represents a request for the cooling operation mode; and (3) a function of setting the opening degree of the PMV 20 to be relative to that of the PMV 21 corresponding to the indoor unit $C_1$ in accordance with a heating capability requested by the signal $H_1$ when the signal $H_1$ represents a request for a heating operation mode (i.e., the opening degree of the PMV 21 is increased and that of the PMV 20 is decreased when the requested heating capability is large, and the opening degree of the PMV 21 is decreased and that of the PMV 20 is increased when the requested heating capability is small), a function of setting the opening degree of the PMV 20 to be relative to that of the PMV 31 corresponding to the indoor unit $C_2$ in accordance with a heating capability requested by the signal $H_2$ when the signal $H_2$ represents a request for a heating operation mode (i.e., the opening degree of the PMV 31 is increased and that of the PMV 20 is decreased when the requested heating capability is large, and the opening degree of the PMV 31 is decreased and that of the PMV 20 is increased when the requested heating capability is small), and a function of setting the opening degree of the PMV 20 to be relative to that of the PMV 41 corresponding to the indoor unit $C_3$ in accordance with a heating capability requested by the signal $H_3$ when the signal $H_3$ represents a request for a heating operation mode (i.e., the opening degree of the PMV 41 is increased and that of the PMV 20 is decreased when the requested heating capability is large, and the opening degree of the PMV 41 is decreased and that of the PMV 20 is increased when the requested heating capability is small).

The valve drive control circuit 607 executes the following functions (4) to (6) when a heating operation mode is determined by the operation mode determination section 604:

(4) a function of discriminating a request for a cooling or heating operation mode on the basis of the signals $H_1$, $H_2$, and $H_3$ from the indoor control sections 70;

(5) a function of controlling the opening degree of the PMV 21 in accordance with a heating capability requested by the signal $H_1$ when the signal $H_1$ represents a request for a heating operation mode, a function of controlling the opening degree of the PMV 31 in accordance with a heating capability requested by the signal $H_2$ when the signal $H_2$ represents a request for the heating operation mode, and a function of controlling the opening degree of the PMV 41 in accordance with a heating capability requested by the signal $H_3$ when the signal $H_3$ represents a request for the heating operation mode; and (6) a function of setting the opening degree of the PMV 20 to be relative to that of the PMV 21 corresponding to the indoor unit $C_1$ in accordance with cooling capability requested by the signal $H_1$ when the signal $H_1$ represents a request for a cooling operation mode (i.e., the opening degree of the PMV 21 is increased and that of the PMV 20 is decreased when the requested cooling capability is large, and the opening degree of the PMV 21 is decreased and that of the PMV 20 is increased when the requested cooling capability is small), a function of setting the opening degree of the PMV 20 to be relative to that of the PMV 31 corresponding to the indoor unit $C_2$ in accordance with a cooling capability requested by the signal $H_2$ when the signal $H_2$ represents a request for a cooling operation mode (i.e., the opening degree of the PMV 31 is increased and that of the PMV 20 is decreased when the requested cooling capability is large, and the opening degree of the PMV 31 is decreased and that of the PMV 20 is increased when the requested cooling capability is small, and a function of setting the opening degree of the PMV 20 to be relative to that of the PMV 41 corresponding to the indoor unit $C_3$ in accordance with a cooling capability requested by the signal $H_3$ when the signal $H_3$ represents a request for a cooling operation mode (i.e., the opening degree of the PMV 41 is increased and that of the PMV 20 is decreased when the requested cooling capability is large, and the opening degree of the PMV 41 is decreased and that of the PMV 20 is increased when the requested cooling capability is small).

Figure 4:
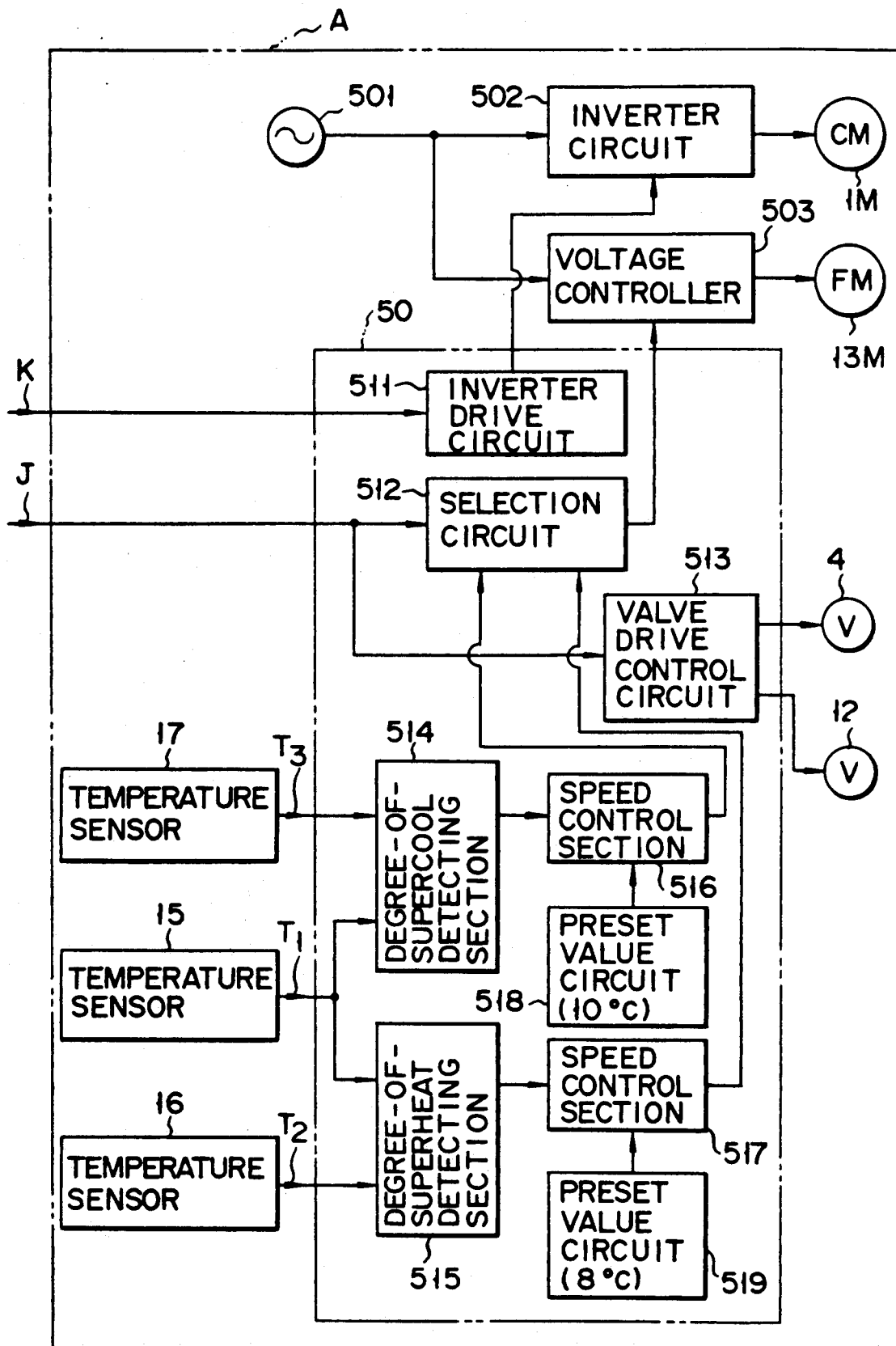
FIG. 4 is a block diagram showing an outdoor control section and its peripheral sections of the multi-system air conditioning machine according to the first embodiment.

A detailed arrangement of the outdoor control section 50 and its peripheral circuits is shown in FIG. 4.

Reference numeral 501 denotes a commercial AC power source. An inverter 502 and a voltage controller 503 are connected to the power source 501.

The inverter 502 rectifies a voltage of the power source 501. The rectified voltage is converted into an AC voltage having a predetermined frequency, and is output. An output voltage from the inverter 502 is supplied to a motor 1M for the compressor 1 as drive power.

The voltage controller 503 converts a voltage of the power source 501 into a voltage having a predetermined level to output the converted voltage. An output voltage from the voltage controller 503 is supplied to a motor 13M for the outdoor fan 13 as drive power.

The outdoor control section 50 includes an inverter drive circuit 511, a selection circuit 512, a valve drive control circuit 513, a degree-of-superheat detecting section 514, a degree-of-supercool detecting section 515, speed control sections 516 and 517, and preset value circuits 518 and 519.

The inverter drive circuit 511 has the following functions (1) and (2):

(1) a function of discriminating a total cooling or heating capability requested from each indoor unit on the basis of the signal K from the multi-control section 60; and (2) a function of controlling an output frequency of the inverter 502 in accordance with the discriminated total value.

The selection circuit 512 has the following functions (1) and (2):

(1) a function of supplying a voltage setting signal from the speed control section 516 to the voltage controller 503 when the signal J from the multi-control section 60 represents determination of a cooling operation mode; and (2) a function of supplying a voltage setting signal from the speed control section 517 to the voltage controller 503 when the signal J from the multi-control section 60 represents determination of a heating operation mode.

The valve drive control circuit 513 has the following functions (1) and (2):

(1) a function of opening the two-way valve 4 and closing the two-way valve 12 when the signal J from the multi-control section 60 represents determination of a cooling operation mode; and (2) a function of closing the two-way valve 4 and opening the two-way valve 12 when the signal J from the multi-control section 60 represents determination of a heating operation mode.

The degree-of-supercool detecting section 514 detects a difference $(T_3 - T_1)$ between the temperature $T_3$ sensed by the temperature sensor 17 and the temperature $T_1$ sensed by the temperature sensor 15 as a degree $\alpha$ of supercool.

The degree-of-superheat detecting section 515 detects a difference $(T_2-T_1)$ between the temperature $T_2$ sensed by the temperature sensor 16 add the temperature $T_1$ sensed by the temperature sensor 15 as a degree $\beta$ of superheat.

The speed control section 516 has the following functions (1) to (3):

(1) a function of comparing the detected degree $\alpha$ of superheat with a preset value, i.e., 10° C., of the preset value circuit 518;

(2) a function of outputting a voltage setting signal to set a speed of the outdoor fan 13 to be maximum when the degree $\alpha$ of supercool is below the preset value, i.e., 10° C.; and (3) a function of setting the voltage setting signal to decrease a speed of the outdoor fan 13 when the degree $\alpha$ of supercool is equal to or exceeds the preset value, i.e., 10° C.

The speed control section 517 has the following functions (1) to (3):

(1) a function of comparing the detected degree $\beta$ of superheat with a preset value, i.e., 8° C., of the preset value circuit 519;

(2) a function of outputting a voltage setting signal to set a speed of the outdoor fan 13 to be maximum when the degree $\beta$ of superheat is below the preset value, i.e., 8° C.; and (3) a function of setting the voltage setting signal to decrease a speed of the outdoor fan 13 when the degree $\beta$ of superheat is equal to or exceeds the preset value, i.e., 8° C.

With the above arrangement, an operation will be described hereinafter.

Assume that the indoor units $C_1$ and $C_2$ request a cooling operation mode, and the indoor unit $C_3$ requests a heating operation mode. In addition, assume that a requested total cooling capability is larger than a requested total heating capability.

Figure 5:
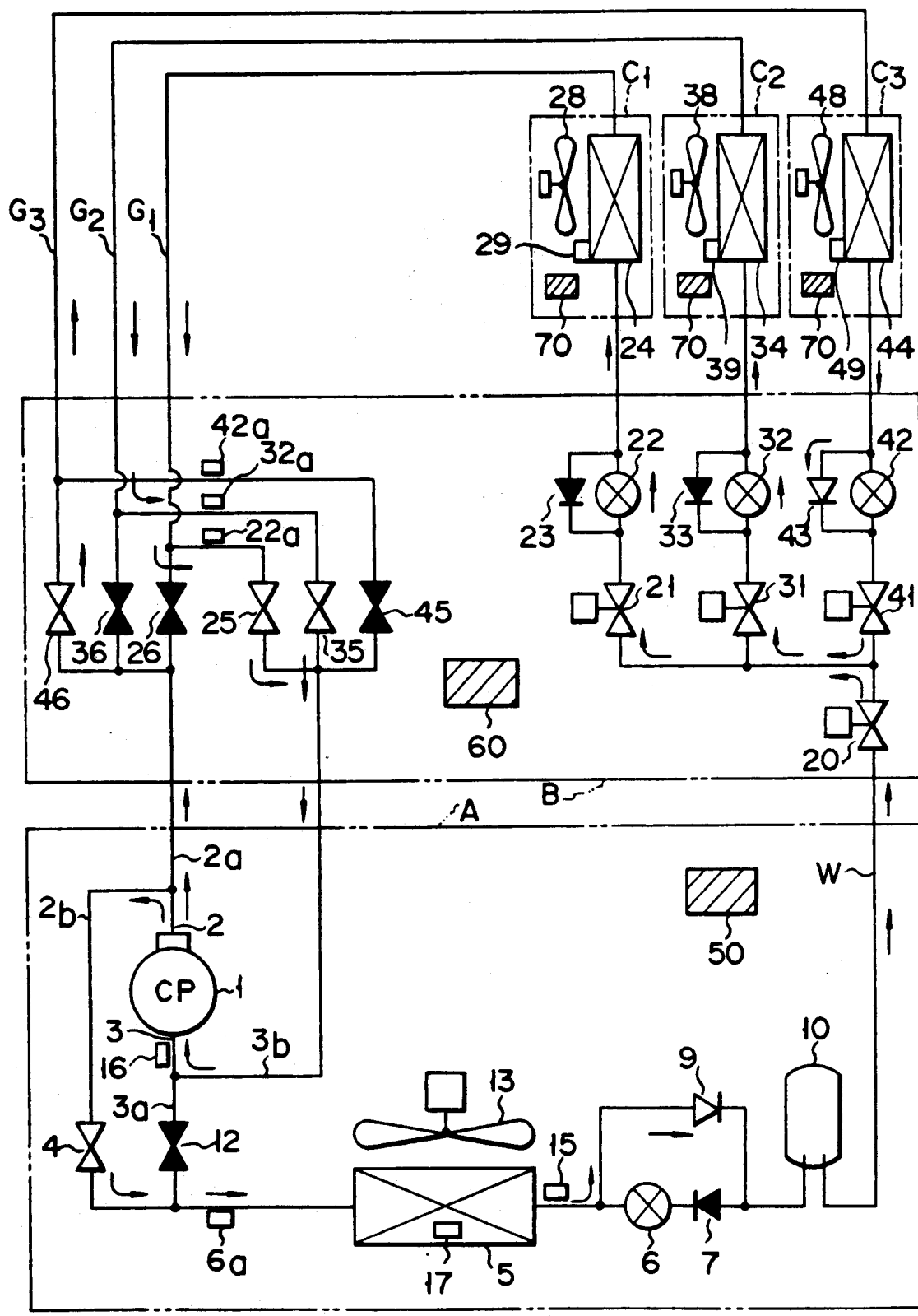
FIG. 5 is a diagram showing the flow of a refrigerant in a cooling operation mode of the multi-system air conditioning machine according to the first embodiment.

In this case, a cooling operation mode is determined, the two-way valve 4 in the outdoor unit A is opened (represented by white), and the two-way valve 12 is closed (represented by black), as shown in FIG. 5.

More specifically, the outdoor heat exchanger 5 is connected to the outlet pipe 2b of the compressor 1.

In the switching unit B, the two-way valves 25, 35, and 46 are opened (represented by white), and the two-way valves 26, 36, and 45 are closed (represented by black).

More specifically, the gas-side pipes $G_1$ and $G_2$ the indoor units $C_1$ and $C_2$ which request a cooling operation mode are connected to the intake pipe 3b of the compressor 1. The gas-side pipe $G_3$ of the indoor unit $C_3$ which requests a heating operation mode is connected to the outlet pipe 2a of the compressor 1.

The refrigerant delivered from the compressor 1 is, therefore, supplied to the outdoor heat exchanger 5 through the two-way valve 4. In the outdoor heat exchanger 5, the refrigerant is condensed. The refrigerant which flows through the outdoor heat exchanger 5 is supplied to the indoor units $C_1$ and $C_2$ through the check valve 9, the liquid tank 10, the PMVs 20, 21, and 31, and the expansion valves 22 and 32. In the indoor units $C_1$ and $C_2$, the refrigerant evaporates. The refrigerant supplied from the indoor units $C_1$ and $C_2$ is drawn into the compressor 1 through the two-way valves 25 and 35.

A part of the refrigerant delivered from the compressor 1 is supplied to the indoor unit $C_3$ through the two-way valve 46. In the indoor unit $C_3$, the refrigerant is condensed. The refrigerant supplied from the indoor unit $C_3$ merges into the flow of the refrigerant supplied to the PMVs 21 and 31, and the indoor units $C_1$ and $C_2$ through the check valve 43 and the PMV 41.

More specifically, the outdoor heat exchanger 5 serves as a condenser, the indoor heat exchangers 24 and 34 serve as evaporators, and the indoor heat exchanger 44 serves as a condenser.

In this case, the heat absorbed by the indoor units $C_1$ and $C_2$ is partially utilized to dissipate the heat from the indoor unit $C_3$.

An output frequency of the inverter 502 is set in accordance with a requested total cooling capability. Therefore, the compressor 1 exhibits a capability for sufficiently covering a cooling capability of the indoor units $C_1$ and $C_2$ each having a large load.

The opening degree of each of the PMVs 21 and 31 is, at this time, controlled in accordance with the cooling capability requested from the indoor units $C_1$ and $C_2$, and the refrigerant is properly distributed to the indoor units $C_1$ and $C_2$. Amounts of refrigerant supplied to the indoor heat exchangers 24 and 34 are controlled by the expansion valves 22 and 32, respectively, and a degree of superheat of the refrigerant is kept constant.

Figure 6:
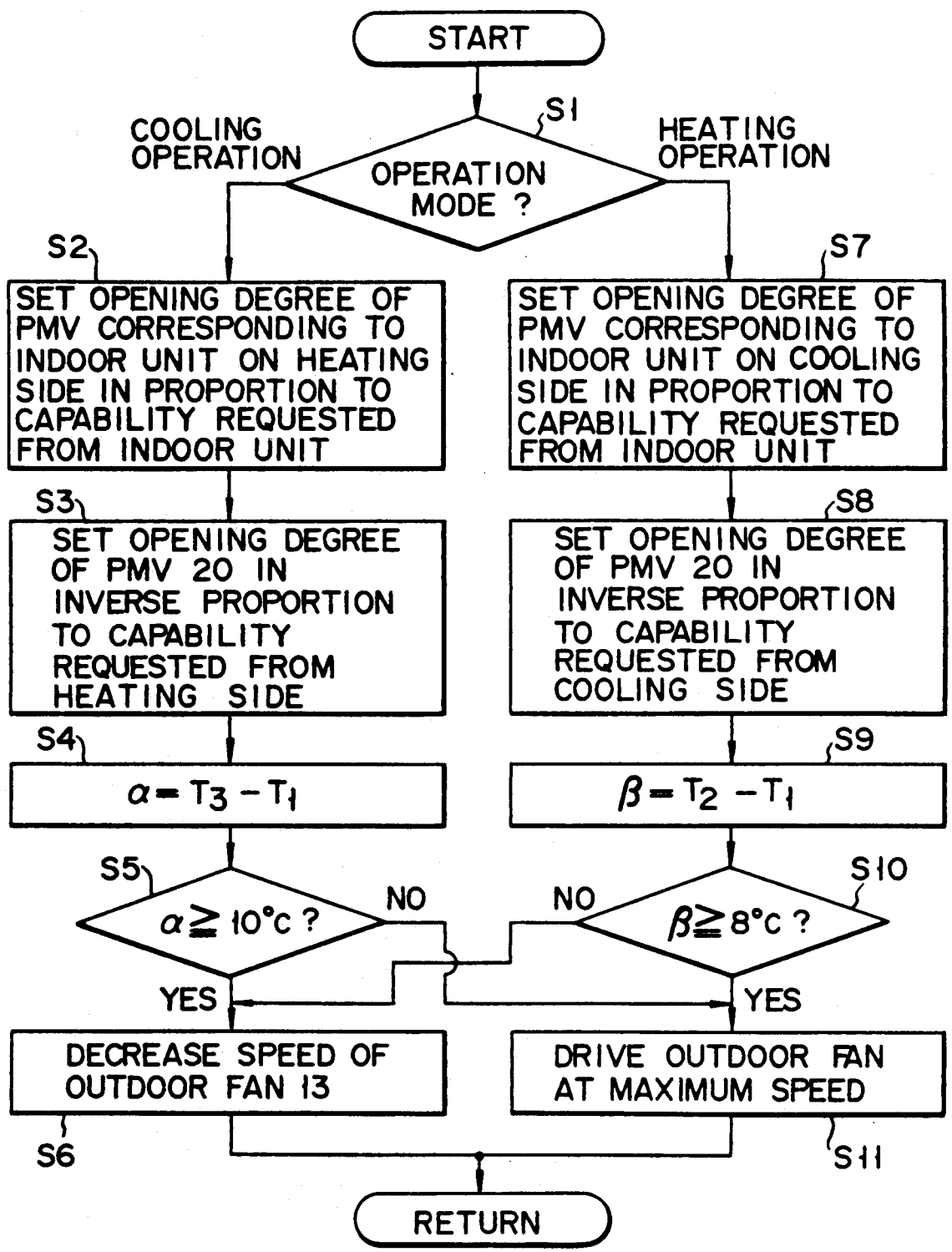
FIG. 6 is a flow chart for explaining an operation of the multi-system air conditioning machine according to the first embodiment.

A sufficient heating capability of the indoor unit $C_3$ can be assured under the control shown in FIGS. 6, 7, and 8.

It is discriminated whether a cooling or heating operation mode is set (step S1).

The opening degree of the PMV 41 corresponding to the indoor unit $C_3$ on the heating side is set in proportion to a heating capability requested by the indoor unit $C_3$ (step S2).

The opening degree of the PMV 20 is set in inverse proportion to a heating capability requested by the indoor unit $C_3$ (step S3).

More specifically, if a large heating capability is requested, the opening degree of the PMV 41 is increased, and that of the PMV 20 is decreased. If a small heating capability is requested, the opening degree of the PMV 41 is decreased, and that of the PMV 20 is increased.

For example, if the requested heating capability is extremely large, and the PMV 41 is fully opened, the PMV 20 is fully closed. On the contrary, when the requested heating capability is set to be "0", the PMV 41 is fully closed, and the PMV 20 is fully opened.

A proper amount of refrigerant is, therefore, distributed to the indoor unit $C_3$ and the outdoor heat exchanger 5, thus assuring a sufficient heating capability for the indoor unit $C_3$.

A degree $\alpha$ of supercool of the refrigerant in the outdoor heat exchanger 5 is detected (step S4).

If the detected degree $\alpha$ of supercool is below 10° C. (step S5), the outdoor fan 13 is driven at a maximum speed (step S11).

If the degree $\alpha$ of supercool is, however, equal to or higher than 10° C. (step S5), a speed of the outdoor fan 13 is reduced (step S6).

If the speed of the outdoor fan 13 is reduced, an amount of heat dissipated from the outdoor heat exchanger 5 is decreased, and the degree $\alpha$ of supercool is decreased.

If the degree $\alpha$ of supercool is below 10° C., an operation of the outdoor fan 13 at a maximum speed is restarted.

The degree $\alpha$ of supercool falls within 10° C., thus continuing a stable operation of the refrigerant apparatus.

Assume that the indoor units $C_1$ and $C_2$ request a heating operation mode, and the indoor unit $C_3$ requests a cooling operation mode. In addition, assume that a requested total heating capability is larger than a requested total cooling capability.

Figure 9:
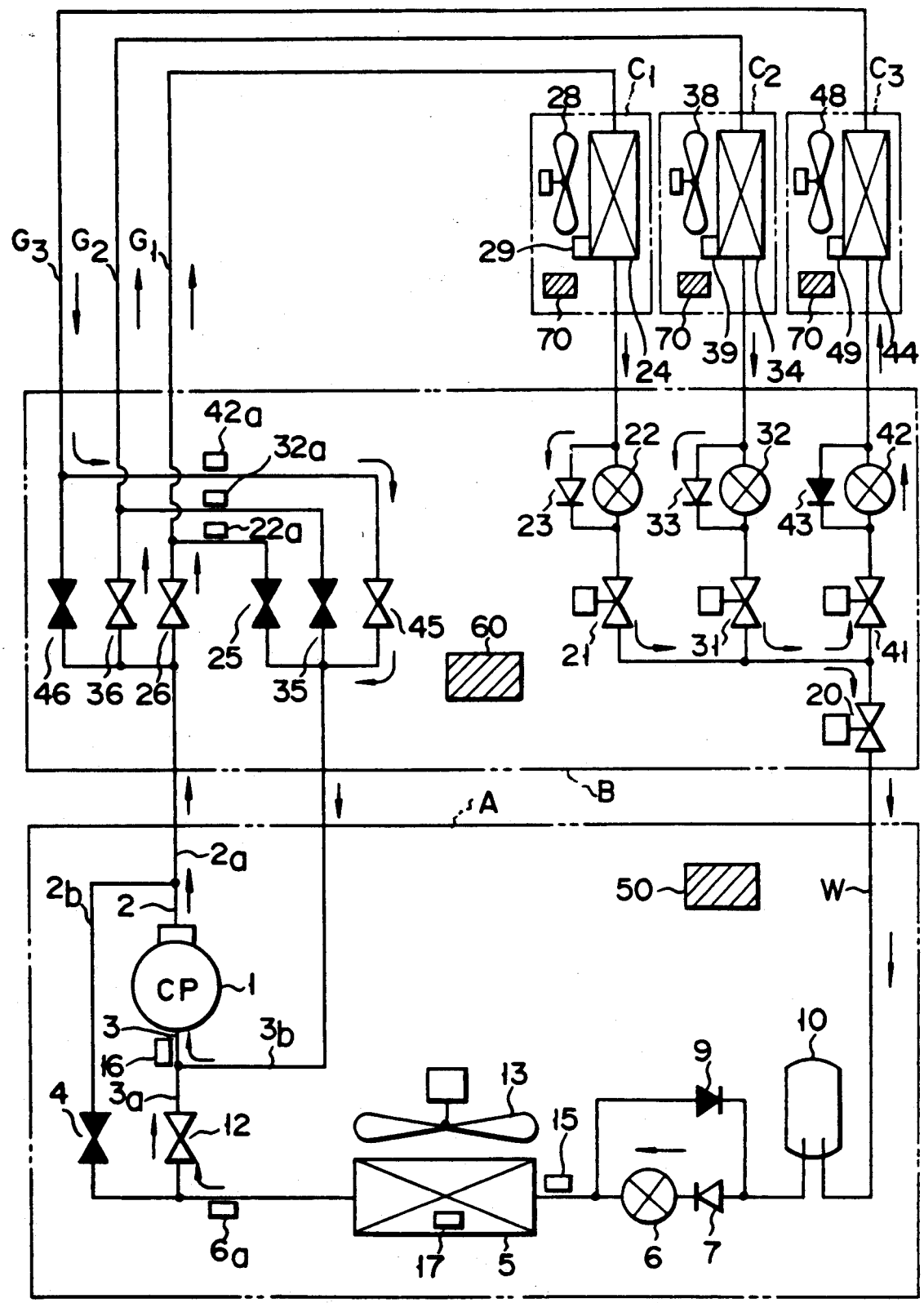
FIG. 9 is a diagram showing the flow of a refrigerant in a heating operation mode of the multi-system air conditioning machine according to the first embodiment.

In this case, a heating operation mode is determined, the two-way valve 4 in the outdoor unit A is closed (represented by black), and the two-way valve 12 is opened (represented by white), as shown in FIG. 9.

More specifically, the outdoor heat exchanger 5 is connected to the intake pipe 3a of the compressor 1.

In the switching unit B, the two-way valves 45, 26, and 36 are opened (represented by white), and the two-way valves 25, 35, and 46 are closed (represented by black).

More specifically, the gas-side pipes $G_1$ and $G_2$ in the indoor units $C_1$ and $C_2$ which request a heating operation mode are connected to the outlet pipe 2a of the compressor 1. The gas-side pipe $G_3$ of the indoor unit $C_3$ which requests a cooling operation mode is connected to the intake pipe 3b of the compressor 1.

The refrigerant components delivered from the compressor 1 are, therefore, supplied to the indoor units $C_1$ and $C_2$ through the two-way valve 26 and 36, respectively. In the indoor units $C_1$ and $C_2$, the refrigerant is condensed. The refrigerant which flows through the indoor units $C_1$ and $C_2$ is supplied to the outdoor heat exchanger 5 through the check valves 23 and 33, the PMVs 21 and 31, the liquid tank 10, the check valve 7, and the expansion valve 6. In the outdoor heat exchanger 5, the refrigerant evaporates. The refrigerant supplied from the outdoor heat exchanger 5 is drawn into the compressor 1 through the two-way valve 12.

In addition, the refrigerant which flows through the indoor units $C_1$ and $C_2$, the check valve 23 and 33, and the PMVs 21 and 31 is partially supplied to the indoor unit $C_3$ through the PMV 41 and the expansion valve 42. In the indoor unit $C_3$, the refrigerant evaporates. The refrigerant supplied from the indoor unit $C_3$ is drawn into the compressor 1 through two-way valve 45.

More specifically, the indoor heat exchangers 24 and 34 serve as condensers, the outdoor heat exchanger 5 serves as an evaporator, and the indoor heat exchanger 44 serves as an evaporator.

In this case, the heat absorbed by the outdoor and indoor heat exchangers 5 and 44 is utilized to dissipate the heat from the indoor units $C_1$ and $C_2$.

An output frequency of the inverter 502 is set in accordance with a requested total heating capability. Therefore, the compressor 1 exhibits a capability for sufficiently covering a heating capability of the indoor units $C_1$ and $C_2$ each having a large load.

At this time, the opening degree of each of the PMVs 21 and 31 is controlled in accordance with the heating capability requested from the indoor units $C_1$ and $C_2$, and the refrigerant is properly distributed to the indoor units $C_1$ and $C_2$.

A sufficient cooling capability of the indoor unit $C_3$ can be assured under the control shown in FIGS. 6, 7, and 10.

It is discriminated whether a cooling or heating operation mode is set (step S1).

The opening degree of the PMV 41 corresponding to the indoor unit $C_3$ on the cooling side is set in proportion to a cooling capability requested by the indoor unit $C_3$ (step S7).

The opening degree of the PMV 20 is set in inverse proportion to a cooling capability requested by the indoor unit $C_3$ (step S8).

More specifically, if a large cooling capability is requested, the opening degree of the PMV 41 is increased, and that of the PMV 20 is decreased. If a small cooling capability is requested, the opening degree of the PMV 41 is decreased, and that of the PMV 20 is increased.

A proper amount of refrigerant is, therefore, distributed to the indoor unit $C_3$ and the outdoor heat exchanger 5, thus assuring a sufficient cooling capability for the indoor unit $C_3$.

The opening degree of the expansion valve 6 is changed to set the degree $\beta$ of superheat of the refrigerant in the outdoor heat exchanger 5 to be constant.

When the indoor unit $C_3$ requests a large cooling capability, and the opening degree of the PMV 20 is small, however, the expansion valve 6 may be fully opened while the degree $\beta$ of superheat is not decreased. In this case, the degree $\beta$ of superheat cannot be kept constant.

In order to eliminate the above disadvantage, therefore, the degree $\beta$ of superheat of the refrigerant in the outdoor heat exchanger 5 is detected (step S9).

If the detected degree $\beta$ of superheat is below 8° C. (step S10), the outdoor fan 13 is driven at a maximum speed (step S11).

If the degree $\beta$ of superheat is, however, equal to or higher than 8° C. (step S10), a speed of the outdoor fan 13 is reduced (step S6).

When the speed of the outdoor fan 13 is reduced, an amount of heat absorbed by the outdoor heat exchanger 5 is decreased, and the degree $\beta$ of superheat is decreased.

When the degree $\beta$ of superheat is below 8° C., an operation of the outdoor fan 13 at a maximum speed is restarted.

The degree $\beta$ of superheat falls within 8° C., thus continuing a stable operation of the refrigerant apparatus.

Figure 12:
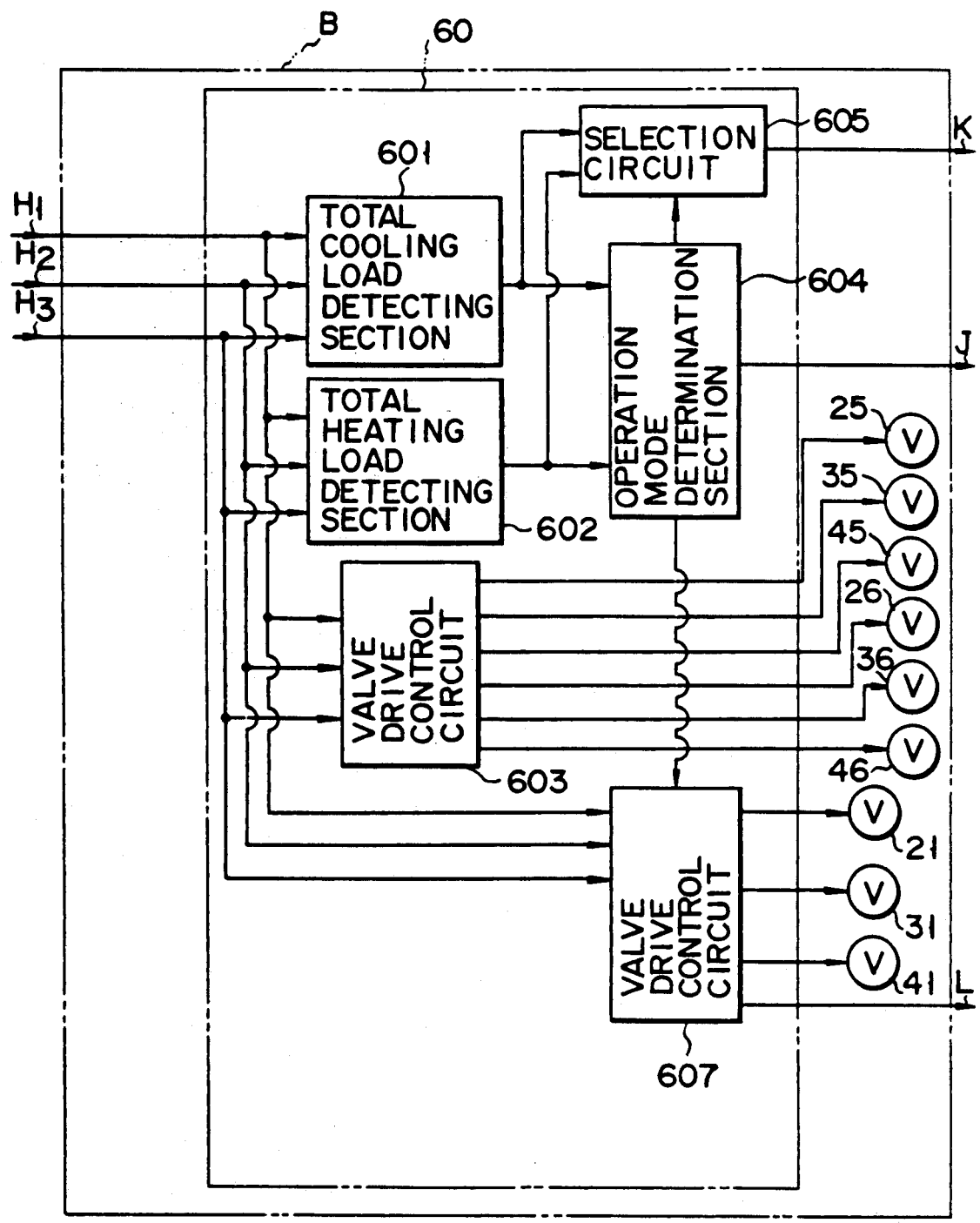
FIG. 12 is a block diagram showing a multi-control section and its peripheral sections of the multi-system air conditioning machine according to the second embodiment.
Figure 13:
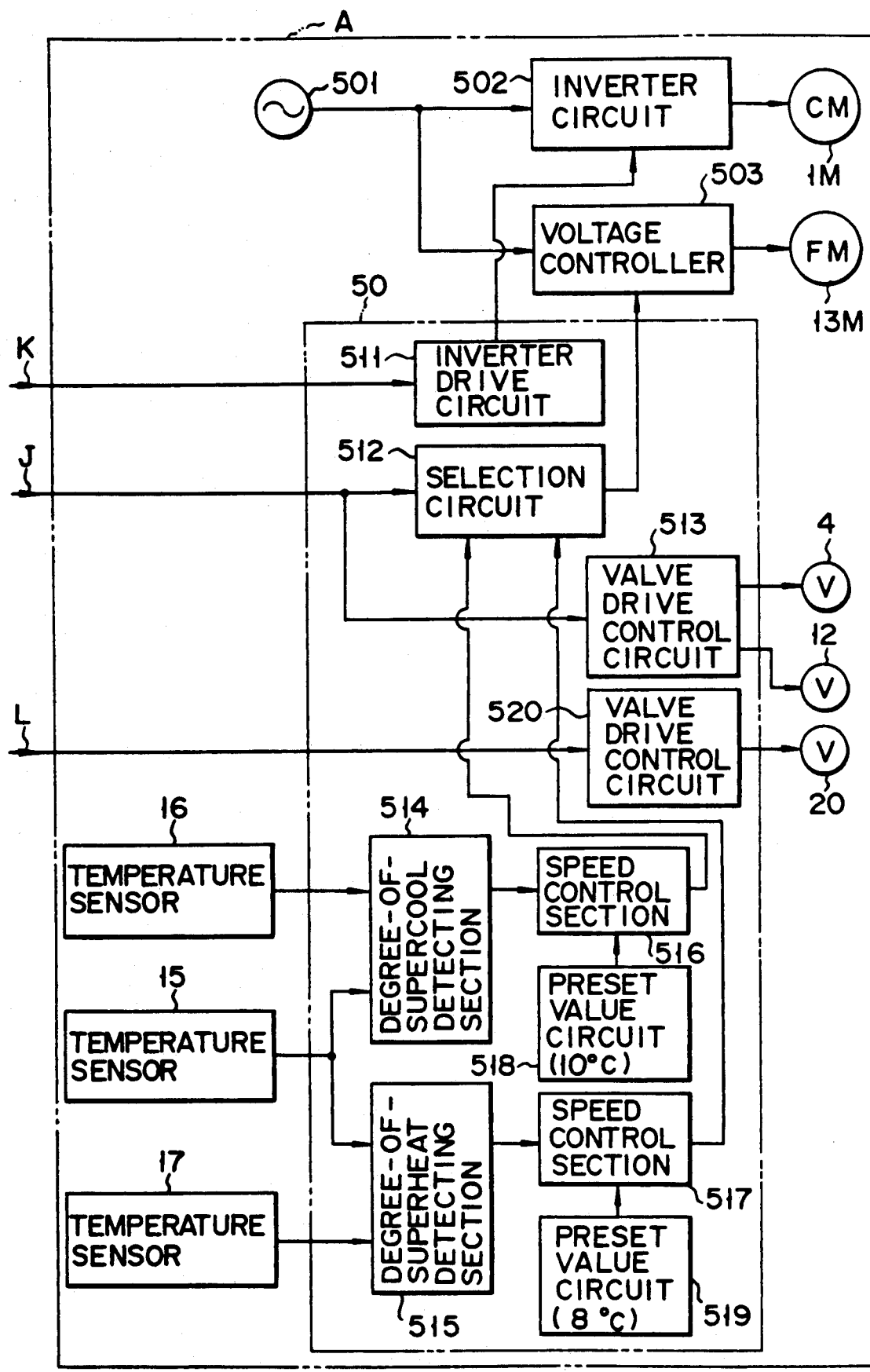
FIG. 13 is a block diagram showing an outdoor control section and its peripheral sections in the multi-system air conditioning machine according to the second embodiment.

The second embodiment of the present invention will be described below with reference to FIGS. 11, 12, and 13. The same reference numerals in FIGS. 11, 12, and 13 denote the same parts as in the first embodiment, and a description thereof will be omitted.

In this embodiment, a PMV 20 is disposed at a pipe between two-way valves 4 and 12 and an outdoor heat exchanger 5.

A valve drive control circuit 607 in a switching unit B does not drive the PMV 20, but outputs an opening degree setting signal L with respect to the PMV 20. The opening degree setting signal L is supplied to an outdoor control section 50.

A valve drive control circuit 520 is additionally arranged in the outdoor control section 50. The valve drive control circuit 20 receives the opening degree setting signal L.

The valve drive control circuit 520 controls the opening degree of the PMV 20 in response to the opening degree setting signal L.

An operation will be described below.

Assume that indoor units $C_1$ and $C_2$ request a cooling operation mode, and an indoor unit $C_3$ requests a heating operation mode. In addition, assume that a requested total cooling capability is larger than a requested total heating capability.

Figure 11:
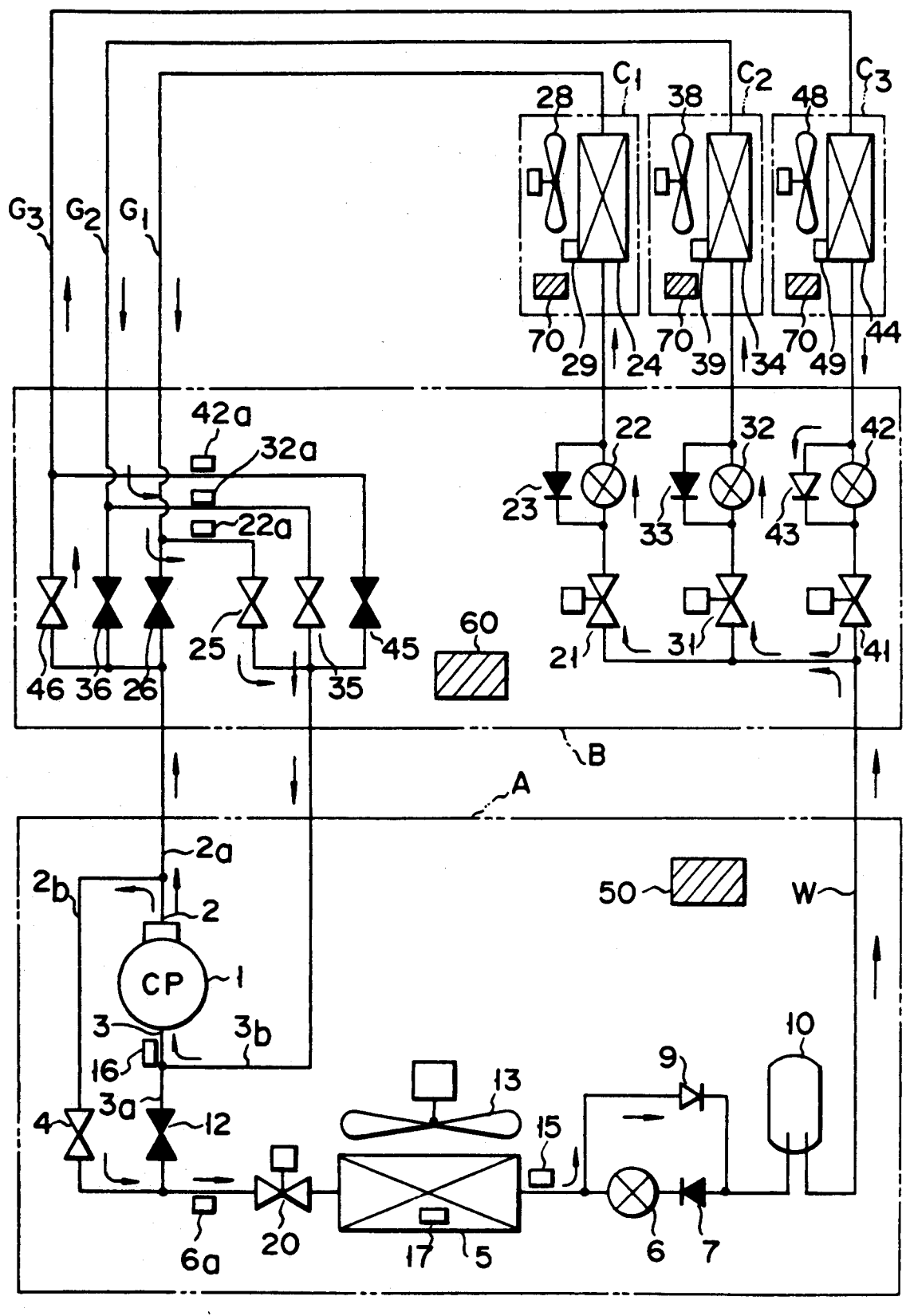
FIG. 11 is a diagram showing an entire arrangement of a multi-system air conditioning machine according to the second embodiment of the present invention.

In this case, a cooling operation mode is determined, the two-way valve 4 in an outdoor unit A is opened (represented by white), and the two-way valve 12 is closed (represented by black), as shown in FIG. 11.

More specifically, the outdoor heat exchanger 5 is connected to an outlet pipe 2b of a compressor 1.

In the switching unit B, two-way valves 25, 35, and 46 are opened (represented by white), and two-way valves 26, 36, and 45 are closed (represented by black).

More specifically, gas-side pipes $G_1$ and $G_2$ in the indoor units $C_1$ and $C_2$ which request a cooling operation mode are connected to an intake pipe 3b of the compressor 1. A gas-side pipe $G_3$ of the indoor unit $C_3$ which requests a heating operation mode is connected to an outlet pipe 2a of the compressor 1.

The refrigerant delivered from the compressor 1 is, therefore, supplied to the outdoor heat exchanger 5 through the two-way valve 4 and the PMV 20. In the outdoor heat exchanger 5, the refrigerant is condensed. The refrigerant which flows through the outdoor heat exchanger 5 is supplied to the indoor units $C_1$ and $C_2$ through a check valve 9, a liquid tank 10, PMVs 21 and 31, and expansion valves 22 and 32. In the indoor units $C_1$ and $C_2$, the refrigerant evaporates. The refrigerant supplied from the indoor units $C_1$ and $C_2$ is drawn into the compressor 1 through the two-way valves 25 and 35.

A part of the refrigerant delivered from the compressor 1 is supplied to the indoor unit $C_3$ through the two-way valve 46. In the indoor unit $C_3$, the refrigerant is condensed. The refrigerant supplied from the indoor unit $C_3$ merges into the flow of the refrigerant supplied to the PMVs 21 and 31, and the indoor units $C_1$ and $C_2$ through a check valve 43 and a PMV 41.

More specifically, the outdoor heat exchanger 5 serves as a condenser, indoor heat exchangers 24 and 34 serve as evaporators, and an indoor heat exchanger 44 serves as a condenser.

In this case, the heat absorbed by the indoor units $C_1$ and $C_2$ is partially utilized to dissipate the heat from the indoor unit $C_3$.

An output frequency of an inverter 502 is set in accordance with a requested total cooling capability. Therefore, the compressor 1 exhibits a capability for sufficiently covering a cooling capability of the indoor units $C_1$ and $C_2$ each having a large load.

The opening degree of each of the PMVs 21 and 31 is, at this time, controlled in accordance with the cooling capability requested from the indoor units $C_1$ and $C_2$, and the refrigerant is properly distributed to the indoor units $C_1$ and $C_2$. Amounts of refrigerant supplied to the indoor heat exchangers 24 and 34 are controlled by the expansion valves 22 and 32, respectively, and a degree of superheat of the refrigerant i kept constant.

A sufficient heating capability of the indoor unit $C_3$ can be assured under the control shown in FIGS. 6, 7, and 8.

It is discriminated whether a cooling or heating operation mode is set (step S1).

The opening degree of the PMV 41 corresponding to the indoor unit $C_3$ on the heating side is set in proportion to a heating capability requested by the indoor unit $C_3$ (step S2).

The opening degree of the PMV 20 is set in inverse proportion to a heating capability requested by the indoor unit $C_3$ (step S3).

More specifically, if a large heating capability is requested, the opening degree of the PMV 41 is increased, and that of the PMV 20 is decreased. If a small heating capability is requested, the opening degree of the PMV 41 is decreased, and that of the PMV 20 is increased.

If the requested heating capability is extremely large, and the PMV 41 is fully opened, the PMV 20 is fully closed. On the contrary, when the requested heating capability is set to be "0", the PMV 41 is fully closed, and the PMV 20 is fully opened.

A proper amount of refrigerant is, therefore, distributed to the indoor unit $C_3$ and the outdoor heat exchanger 5, thus assuring a sufficient heating capability for the indoor unit $C_3$.

A degree $\alpha$ of supercool of the refrigerant in the outdoor heat exchanger 5 is detected (step S4).

If the detected degree $\alpha$ of supercool is below 10° C. (step S5), an outdoor fan 13 is driven at a maximum speed (step S11).

If the degree $\alpha$ of supercool is, however, equal to or exceeds 10° C. (step S5), a speed of the outdoor fan 13 is reduced (step S6).

If the speed of the outdoor fan 13 is reduced, an amount of heat dissipated from the outdoor heat exchanger 5 is decreased, and the degree $\alpha$ of supercool is decreased.

If the degree $\alpha$ of supercool is below 10° C., an operation of the outdoor fan 13 at a maximum speed is restarted.

The degree $\alpha$ of supercool falls within 10° C., thus continuing a stable operation of the refrigerant apparatus.

As described above, when the indoor unit $C_3$ requests a large heating capability, the PMV 41 is fully opened, and the PMV 20 is fully closed, a refrigerant does not flow into the outdoor heat exchanger 5.

If a refrigerant does not flow into the outdoor heat exchanger 5, the refrigerant does not trap in the outdoor heat exchanger 5. Therefore, a lack of the refrigerant can be prevented.

An operation in a heating operation mode is the same as in the first embodiment.

The third embodiment of the present invention will be described below with reference to FIGS. 14 and 15. The same reference numerals in FIGS. 14 and 15 denote the same parts as in the second embodiment, and a description thereof will be omitted.

In this embodiment, the two-way valve 4 in the outdoor unit A is replaced by a PMV 20.

A valve drive control circuit 513 in the indoor unit A controls only an opening/closing state of a two-way valve 12 on the basis of a signal J from a multi-control section 60.

A valve drive control circuit 520 receives the signal J from the multi-control section 60. The valve drive control circuit 520 controls the opening degree of the PMV 20 on the basis of a signal L from a switching unit B in a cooling operation mode, and fully closes the PMV 20 in a heating operation mode.

With the above arrangement, the same operation as in the second embodiment can be obtained in only a cooling operation mode. However, since the opening degree of the PMV 20 is not controlled in a heating operation mode, a refrigerant is not distributed.

Note that although a case wherein three indoor units are used is exemplified in the above embodiments, the present invention is not limited thereto, and four or more indoor units may be employed.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A multi-system air conditioning machine comprising:

an outdoor unit including a compressor for drawing, compressing, and delivering a refrigerant, and an outdoor heat exchanger for exchanging heat of the supplied refrigerant and heat of outer air;

a plurality of indoor units each including an indoor heat exchanger for exchanging the heat of the supplied refrigerant and heat of inner air, for requiring a cooling operation mode and a cooling capability or a heating operation mode and a heating capability;

means for supplying the refrigerant delivered from said compressor to said outdoor heat exchanger, supplying the refrigerant to one or said plurality of indoor units which request a cooling operation mode, and returning the refrigerant to said compressor when a total cooling capability requested from one or said plurality of indoor units is larger than a total heating capability requested from the remaining one or plurality of indoor units;

means for supplying a part of the refrigerant delivered from said compressor to one or said plurality of indoor units which request a heating operation mode to cause the part of refrigerant to join the flow of the refrigerant to one or said plurality of indoor units which request a cooling operation mode, when a total cooling capability requested from one or said plurality of indoor units is larger than a total heating capability requested from the remaining one or plurality of indoor units;

setting means for setting an amount of refrigerant supplied to said outdoor heat exchanger to be relative to an amount of refrigerant supplied to one or said plurality of indoor units which request the heating operation mode in accordance with the total heating capability requested from one or said plurality of indoor units when the total cooling capability requested from one or said plurality of indoor units is larger than the total heating capability requested from the remaining one or plurality of indoor units;

means for supplying the refrigerant delivered from said compressor to one or said plurality of indoor units which request a heating operation mode, supplying the refrigerant to said outdoor heat exchanger, and returning the refrigerant to said compressor, when a total heating capability requested from one or said plurality of indoor units is larger than a total cooling capability requested from the remaining one or plurality of indoor units;

means for supplying a part of the refrigerant supplied from one or said plurality of indoor units which request a heating operation mode to one or said plurality of indoor units which request a cooling operation mode, and returning the refrigerant to said compressor, when a total heating capability requested from one or said plurality of indoor units is larger than a total cooling capability requested from the remaining one or plurality of indoor units; and setting means for setting an amount of refrigerant supplied to said outdoor heat exchanger to be relative to an amount of refrigerant supplied to one or said plurality of indoor units which request the cooling operation mode in accordance with the total cooling capability requested from one or said plurality of indoor units when the total heating capability requested from one or said plurality of indoor units is larger than the total cooling capability requested from the remaining one or plurality of indoor units.

2. A machine according to claim 1, wherein said compressor includes outlet and intake ports for the refrigerant.

3. A machine according to claim 1, wherein each of said setting means includes a pulse motor valve.

4. A multi-system air conditioning machine comprising:

an outdoor unit including a compressor for drawing, compressing, and delivering a refrigerant, an outdoor heat exchanger for exchanging heat of the supplied refrigerant and heat of outer air, and an outdoor fan for circulating the outer air in said outdoor heat exchanger;

a plurality of indoor units each including an indoor heat exchanger for exchanging the heat of the supplied refrigerant and heat of inner air, and an indoor fan for circulating the inner air in said indoor heat exchanger, for requiring a cooling operation mode and a cooling capability or a heating operation mode and a heating capability;

means for supplying the refrigerant delivered from said compressor to said outdoor heat exchanger, supplying the refrigerant to one or said plurality of indoor units which request a cooling operation mode, and returning the refrigerant to said compressor when a total cooling capability requested from one or said plurality of indoor units is larger than a total heating capability requested from the remaining one or plurality of indoor units;

means for supplying a part of the refrigerant delivered from said compressor to one or said plurality of indoor units which request a heating operation mode to cause the part of refrigerant to join the flow of the refrigerant to one or said plurality of indoor units which request a cooling operation mode, when a total cooling capability requested from one or said plurality of indoor units is larger than a total heating capability requested from the remaining one or plurality of indoor units;

setting means for setting an amount of refrigerant supplied to said outdoor heat exchanger to be relative to an amount of refrigerant supplied to one or said plurality of indoor units which request the heating operation mode in accordance with the total heating capability requested from one or said plurality of indoor units when the total cooling capability requested from one or said plurality of indoor units is larger than the total heating capability requested from the remaining one or plurality of indoor units;

means for supplying the refrigerant delivered from said compressor to one or said plurality of indoor units which request a heating operation mode, supplying the refrigerant to said outdoor heat exchanger, and returning the refrigerant to said compressor, when a total heating capability requested from one or said plurality of indoor units is larger than a total cooling capability requested from the remaining one or plurality of indoor units;

means for supplying a part of the refrigerant supplied from one or said plurality of indoor units which request a heating operation mode to one or said plurality of indoor units which request a cooling operation mode, and returning the refrigerant to said compressor, when a total heating capability requested from one or said plurality of indoor units is larger than a total cooling capability requested from the remaining one or plurality of indoor units;

setting means for setting an amount of refrigerant supplied to said outdoor heat exchanger to be relative to an amount of refrigerant supplied to one or said plurality of indoor units which request the cooling operation mode in accordance with the total cooling capability requested from one or said plurality of indoor units when the total heating capability requested from one or said plurality of indoor units is larger than the total cooling capability requested from the remaining one or plurality of indoor units;

detecting means for detecting a degree of superheat or supercool of the refrigerant in said outdoor heat exchanger; and control means for controlling a speed of said outdoor fan so that a detection result of said detecting means falls within a predetermined range.

5. A machine according to claim 4, wherein said compressor includes outlet and intake ports for the refrigerant.

6. A machine according to claim 4, wherein each of said setting means includes a pulse motor valve.

7. A machine according to claim 4, wherein said detecting means detects a difference between a temperature of the refrigerant supplied to said outdoor heat exchanger and a temperature of the refrigerant supplied from said outdoor heat exchanger as the degree of supercool.

8. A machine according to claim 4, wherein said detecting means detects a difference between a temperature of the refrigerant supplied from said outdoor heat exchanger and a temperature of the refrigerant supplied to said outdoor heat exchanger as the degree of superheat.

9. A machine according to claim 4, further comprising a voltage controller for supplying drive power to said outdoor fan.

10. A machine according to claim 9, wherein said voltage controller converts a voltage of a commercial AC power source into a voltage having a predetermined level to output the converted voltage.

11. A machine according to claim 9, wherein said control means controls an output voltage of said voltage controller.

* * * * *